(12) United States Patent
Lutz

(10) Patent No.: US 6,581,965 B2
(45) Date of Patent: Jun. 24, 2003

(54) DEVICE FOR HEIGHT AND LONGITUDINAL ADJUSTMENT OF A STEERING COLUMN OF A MOTOR VEHICLE

(75) Inventor: Christian Lutz, Nüziders (AU)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 09/894,673

(22) Filed: Jun. 28, 2001

(65) Prior Publication Data

US 2002/0011725 A1 Jan. 31, 2002

(30) Foreign Application Priority Data

Jun. 29, 2000 (DE) .......................................... 100 31 721

(51) Int. Cl.[7] .............................................. B62D 1/187
(52) U.S. Cl. ............................. 280/775; 74/493; 180/78
(58) Field of Search ................................ 280/775, 776, 280/777; 74/493, 492; 180/78

(56) References Cited

U.S. PATENT DOCUMENTS 5,606,891 A * 3/1997 Tisell et al. ................... 74/493
6,095,012 A * 8/2000 Lutz ............................. 74/493
6,386,587 B1 * 5/2002 Hebenstreit et al. ........ 280/775

FOREIGN PATENT DOCUMENTS

| DE | 1780061 | 1/1972 |
|----|---------|--------|
| DE | 2412696 | 9/1975 |
| DE | 9643203 | 4/1998 |
| DE | 9933677 | 1/2001 |
| EP | 0671308 | 9/1995 |
| EP | 0802104 | 10/1997 |
| GB | 2092966 | 8/1982 |

* cited by examiner

Primary Examiner—Paul N. Dickson
Assistant Examiner—Deanna Draper
(74) Attorney, Agent, or Firm—Sidley Austin Brown & Wood, LLP

(57) ABSTRACT

A device for effecting height and longitudinal adjustment of a steering column of a vehicle and including first and second adjustment devices for adjusting, respectively, height and length of the steering column, with the first adjusting devices including a lamella stack formed of alternating large and small lamellas through which a locking bolt extends, with the large lamellas being arranged in or on the bracket with a possibility of changing of spacing therebetween but without a possibility of displacement in a direction of the height adjustment of the steering column, the large lamellas having each an inner recess for enabling displacement of the locking bolt relative to the bracket in the open position of the first adjusting device to enable the height adjustment of the steering column, and with the small lamellas being arranged for displacement in an axial direction of the locking bolt but without a possibility of displacement relative to the locking bolt in the direction of the height adjustment of the steering column.

36 Claims, 10 Drawing Sheets

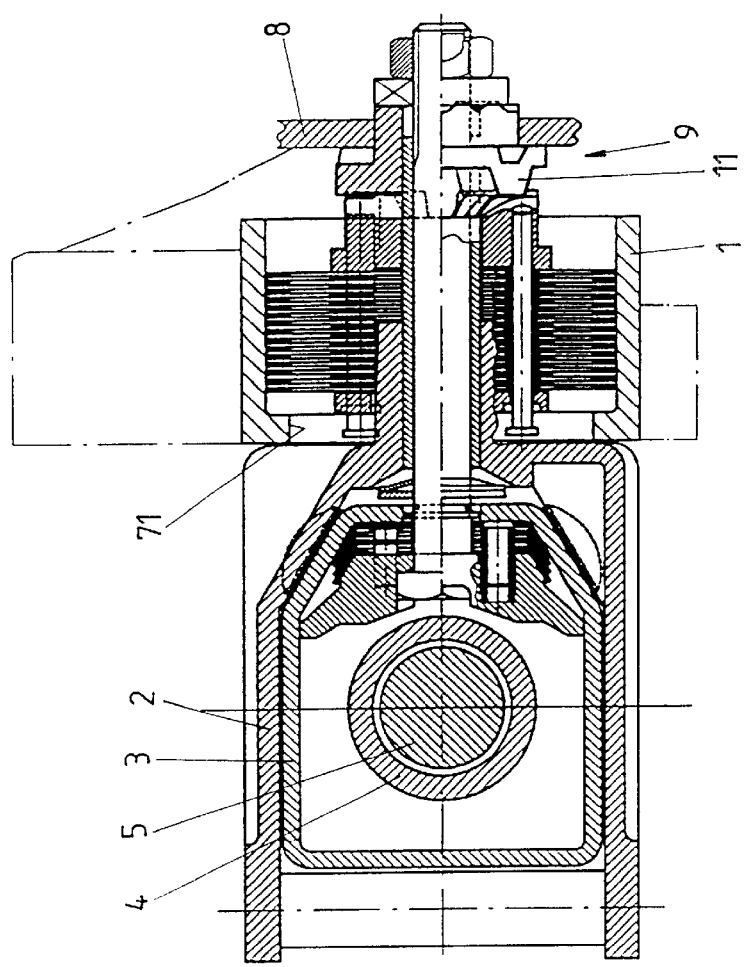
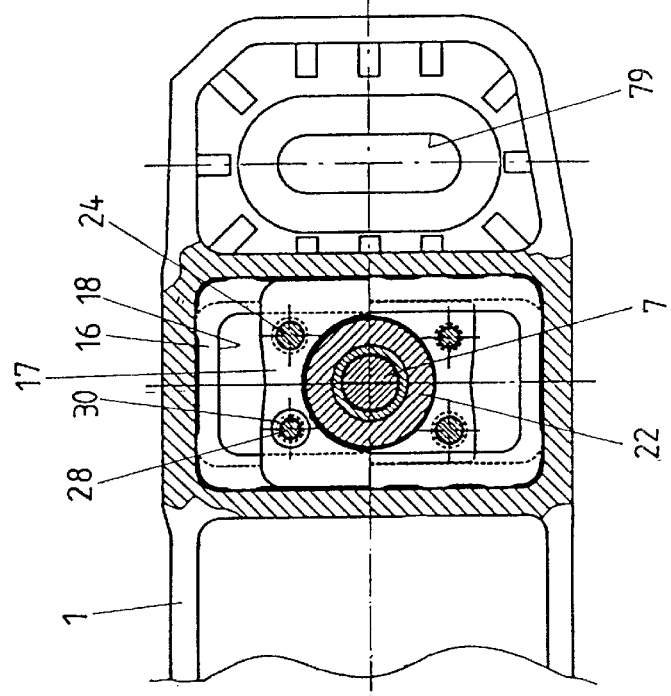
Fig. 2
Fig. 1

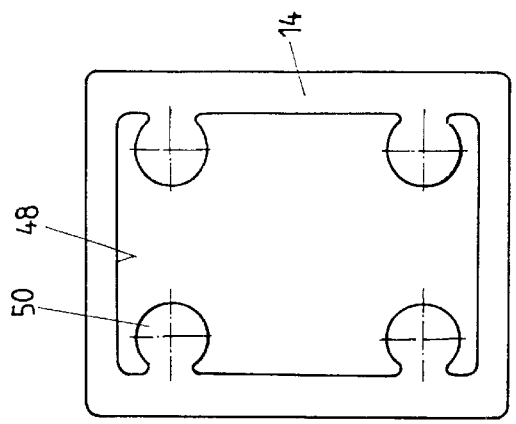
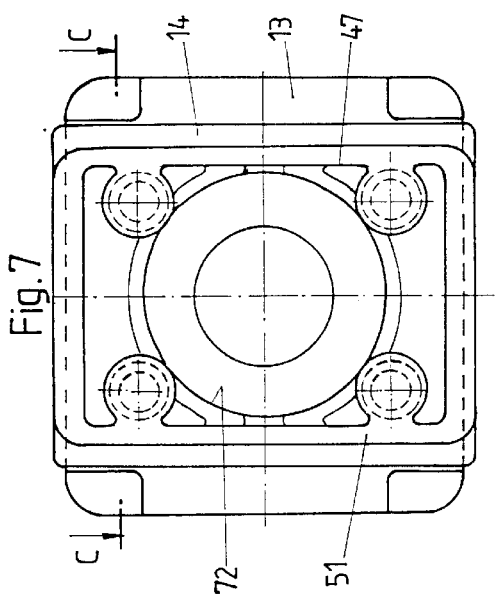
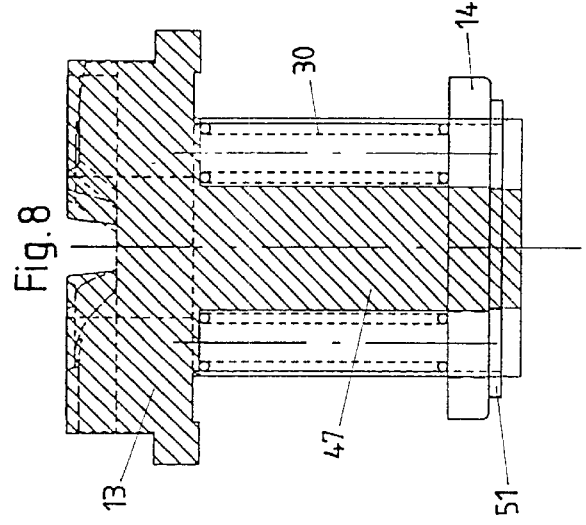
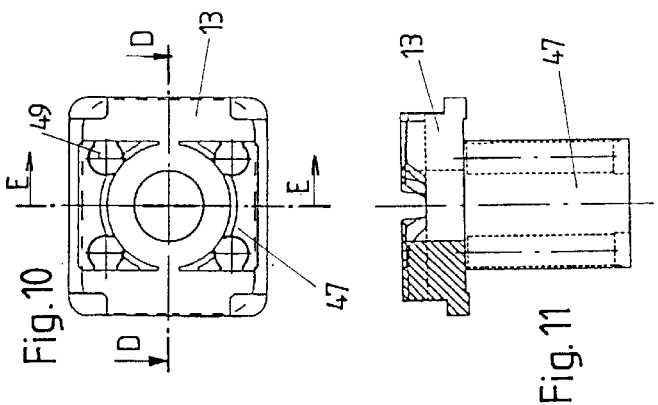
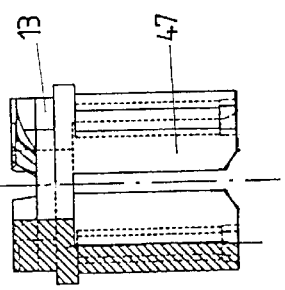

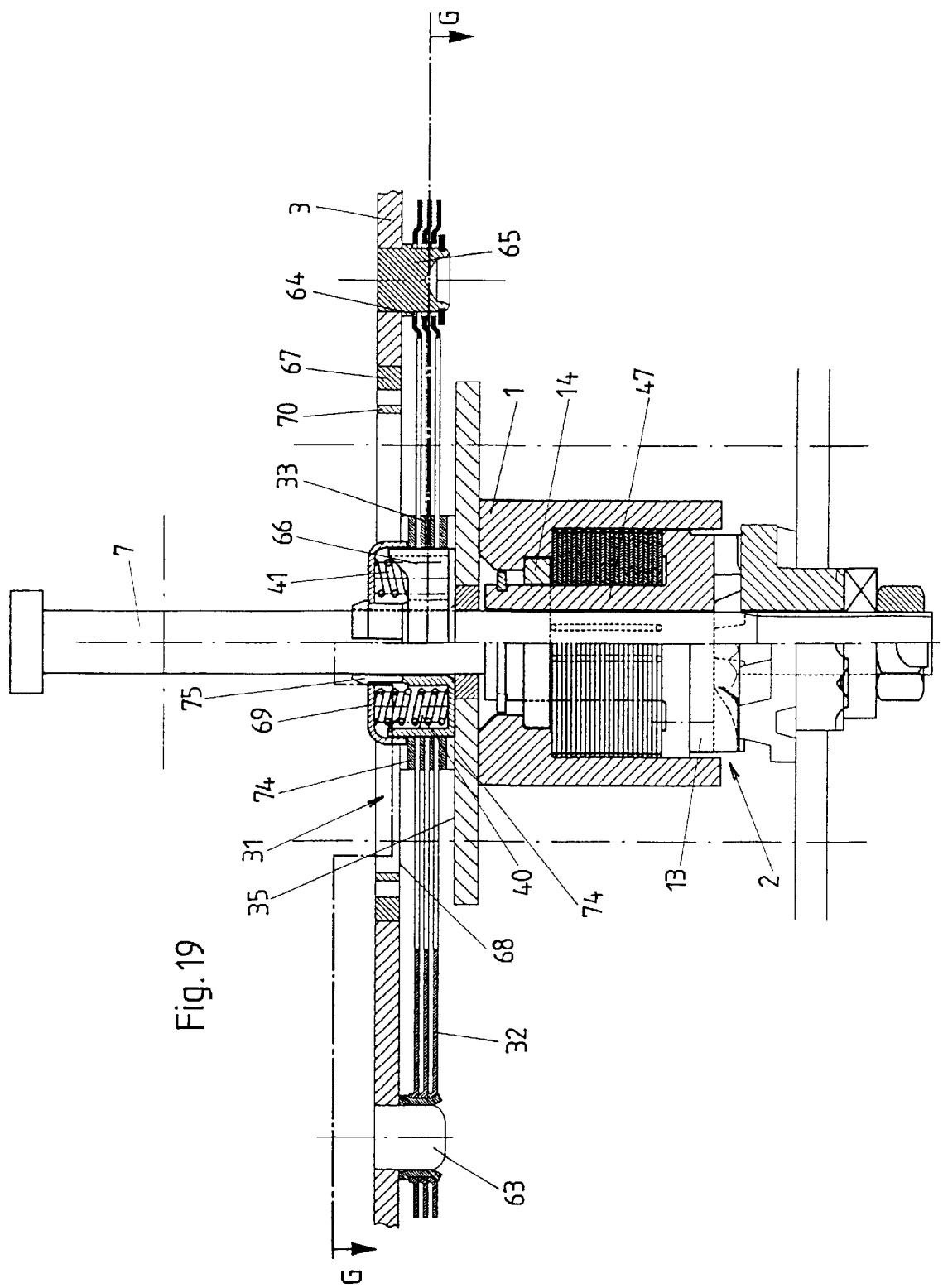

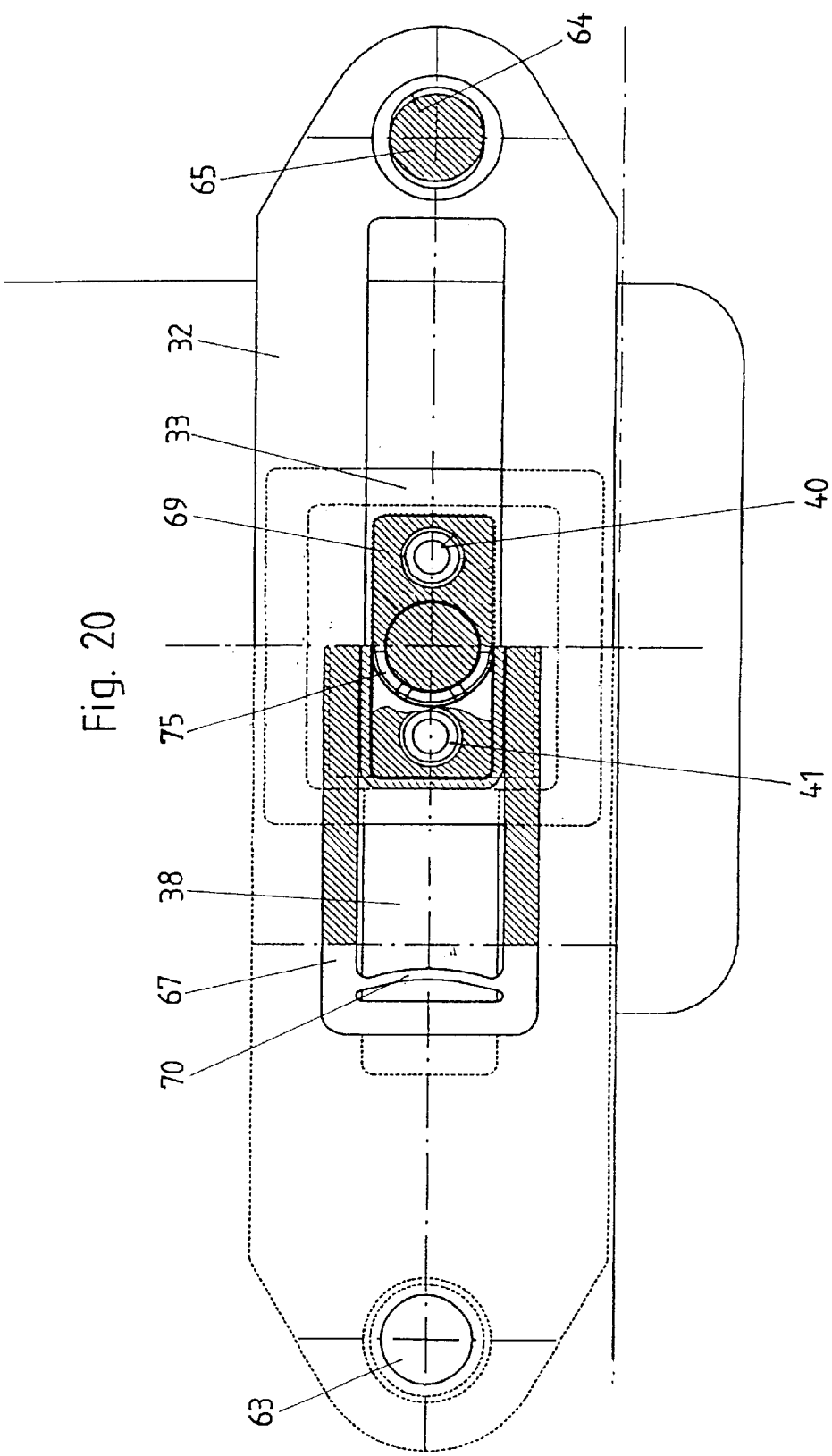

DEVICE FOR HEIGHT AND LONGITUDINAL ADJUSTMENT OF A STEERING COLUMN OF A MOTOR VEHICLE

BACKGROUND OF THE INVENTION

1. Field of the Invention

The present invention relates to a device for effecting height and longitudinal adjustment of a steering column of a motor vehicle and including a first adjusting device for height adjusting the steering column, a second adjusting device for longitudinal adjusting the steering column, a locking device having open and closed positions for simultaneously opening and closing the first and second adjusting devices and including a locking bolt, a bracket fixedly securable to a motor vehicle chassis, a guide member pivotally supported on the bracket, the locking bolt being supported in the guide member and extending through an opening formed in the bracket, the locking bolt being displaceable in the guide member in direction of a locking bolt axis and being displaceable, for the height adjustment of the steering column, together with the guide member, transverse to its axial extent and substantially transverse to an axial extent of steering shaft of the steering column, and a steering volume tube having a longitudinal bore extending in an axial direction of the steering shaft and through which the locking bolt extends, the steering volume tube being displaceable in the axial direction of the steering shaft to provide for longitudinal adjustment of the steering column.

2. Description of the Prior Art

A device of the above-described type for effecting longitudinal and height or angular adjustment of a steering column is disclosed in German Publication DE 196 43 203 A1. The adjustment devices in the known device are formed by first and second toothings which cooperate with a common locking device. The locking bolt of the locking device provides for two separable forcelocking circuits, namely, for effecting the height or angular adjustment and for effecting the longitudinal adjustment. The purpose of separation of the two adjustments is to be able to provide a break-off location in the forcelocking means (for the longitudinal adjustment) so that in case of a crash accident, only the circuit, in which the break-off location is provided, opens, with the other circuit remaining closed. As a result, during the crash accident, the steering column is displaced only axially, with the height or inclination of the steering column remaining unchanged.

The known device provides for a reliable fixation of the steering column in the closed position of the locking device and a relatively easy adjustment of the steering column in the open position of the locking device. However, with this device, closing of the locking device is not possible when even if only two teeth for the toothings for the longitudinal or height adjustment lie one above the other. Therefore, before closing of the locking device, the position of the longitudinal and height adjustment of the steering column, the braking friction, need be overcome. This position should be easily changeable, and the changing should be conducted until the locking device can be closed. To prevent superimposition of the teeth, a device, which would prevent the superimposition of two teeth during closing of the locking device, has been suggested. However, the proposed device is unreliable and its use is connected with increased costs of its production. The superimposition of teeth takes place in particular in the adjusting device for the height adjustment as the forces generated by this device are larger than the forces generated by the length adjusting device. Therefore, the teeth of the height-adjustment toothing need be formed stronger and higher.

Prior art also discloses the use of lamella stacks for securing and adjusting of steering columns. Adjusting devices with lamella stacks are disclosed in European Publications EP 0802104A1, EP 671308A1, German Publication De-OS 2412,696 and DE-OS1780061, and a British Publication GB2092966A. In the disclosed publications a single lamella stack is used for securing both the longitudinal and height adjusting positions. Because of large holding forces required for height adjustment, the lamella stack should include a large number of lamellas or they should have large cooperating surfaces. This results in a substantial friction even in the open position of the locking device which requires an application of a large force by a user in order to overcome the friction during the height adjustment.

Accordingly, an object of the present invention is to provide a device with which adjusting device for the height adjustment can be easily closed, with the height adjustment being easily effected, and without much wear.

SUMMARY OF THE INVENTION

This and other objects of the present invention, which will become apparent hereinafter, are achieved by providing a device in which the first adjusting device comprises a lamella stack formed of alternating large and small lamellas through which the locking bolt extends, first and second clamping plates arranged on opposite side of the lamella stack for clamping same in a closed position of the first adjusting device, and spring means for distancing the first and second clamping plates further away from each other in an open position of the first adjusting device, with the large lamellas being arranged in or on the bracket with a possibility of changing of spacing therebetween but without a possibility of displacement in a direction of the height adjustment of the steering column, with the large lamellas having each an inner recess for enabling displacement of the locking bolt relative to the bracket in the open position of the first adjusting device to enable the height adjustment of the steering column, and with the small lamellas being arranged for displacement in an axial direction of the locking bolt but without a possibility of displacement relative to the locking bolt in the direction of the height adjustment of the steering column, the small lamellas being displaceable with respect to the large lamellas in the open position of the first adjusting device upon the displacement of the locking bolt relative to the bracket.

By using a friction connection with a lamella stack, a sufficiently high holding force for the height-adjusting device is obtained also during a crash accident. During the tests, a crash-holding force should amount to more than 1000 kg. To this end, the lamella stack should include a corresponding number of lamellas or a smaller number of large surface lamellas. A stack formed of at least twelve large lamellas and at least eleven small lamellas, which are located between the large lamellas permits to achieve a desired holding force. The use of springs, which keep the clamping plates away from each other in the open position of the first adjusting device provides for floating retaining of the lamellas in a space between the clamping plates in the open position of the first adjusting device. The friction during the height adjustment remains, therefore, relatively small in relation to the obtainable holding force and despite large numbers of lamellas or large friction surfaces of the lamellas.

Advantageously, the second adjusting device is likewise based on the principle of friction connection and also preferably includes a lamella stack. For longitudinal adjustment much smaller holding forces are required, in the region of 400 kg. Correspondingly, the lamella stack can consist of fewer lamellas, which substantially reduces friction during the longitudinal adjustment. In principle, it is possible to use in a length-adjusting device only two friction plates which become preloaded against each other in the closed conditions of the locking device. With two friction plates, one of both cooperating surfaces can be formed with ribs for increasing friction in the closed condition of the locking device (which also permit to obtain more or less stronger form locking connection). One or both plates can also be provided with toothing.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a partially cross-sectional side view of a first embodiment of a steering column according to the present invention;

FIG. 2 a cross-sectional view of the steering column shown in FIG. 1;

FIG. 7 a view from beneath in direction of arrow B in FIG. 8;

FIG. 8 a cross-sectional view along line C—C in FIG. 7 of clamping plates according to a second embodiment of the present invention;

FIG. 9 a view corresponding to that of FIG. 7 of a first clamping plate;

FIG. 10 a view corresponding to that of FIG. 7 of a second clamping plate;

FIG. 11 a cross-sectional view along line 2—2 in FIG. 10;

FIG. 12 a cross-sectional view along line E—E in FIG. 10;

FIG. 19 a horizontal cross-sectional view of a steering column according to the fourth embodiment of the present invention; and FIG. 20 a cross-sectional view along line G—G in FIG. 19.

DETAILED DESCRIPTION OF THE PREFERRED EMBODIMENTS

Figure 3:
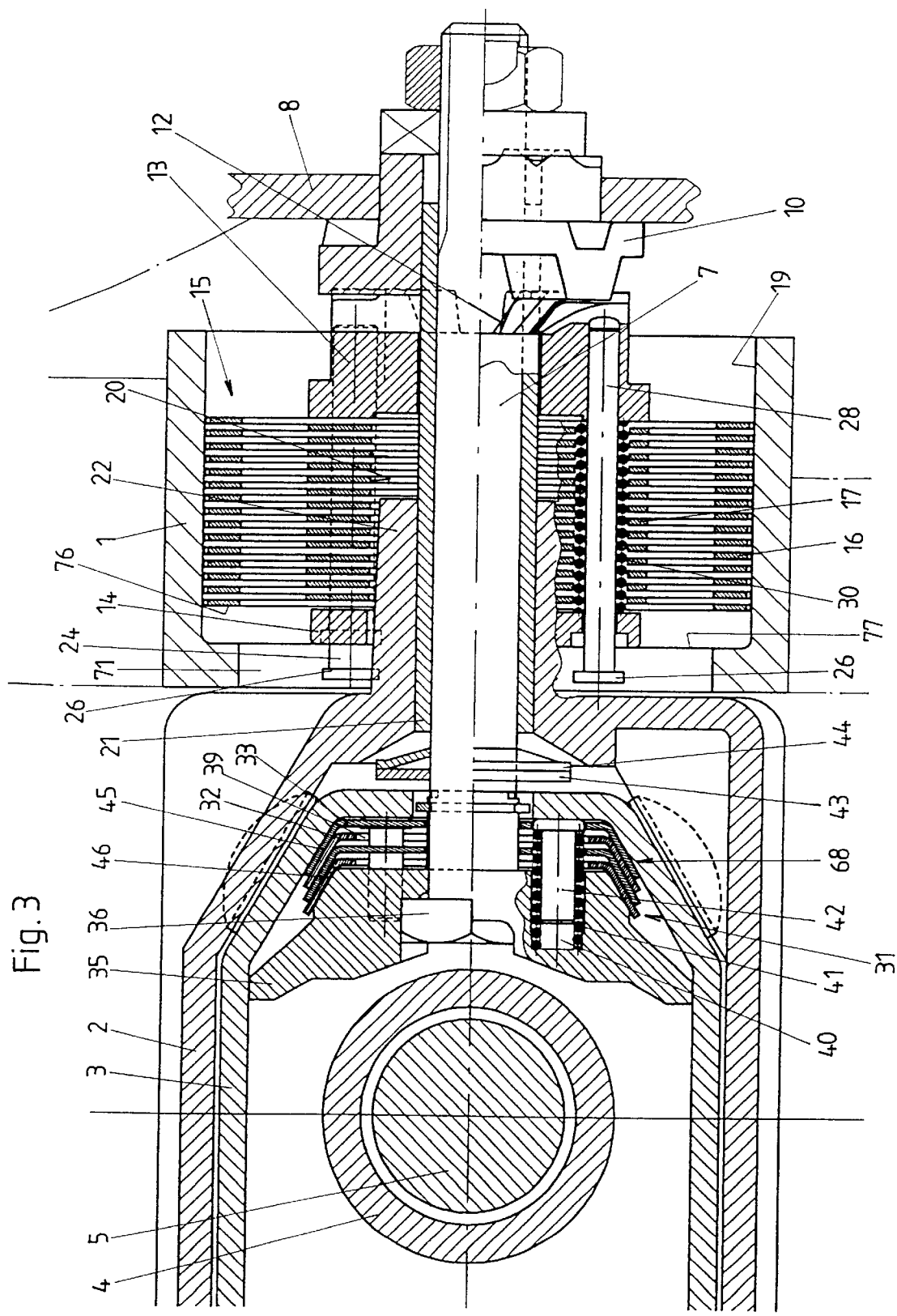
FIG. 3 a view similar to that of FIG. 2 at an increased scale.

In all of the embodiments of a steering column according to the present invention shown in the drawings and described in detail below, the same reference numerals are used for designating the same elements.

Figure 4:
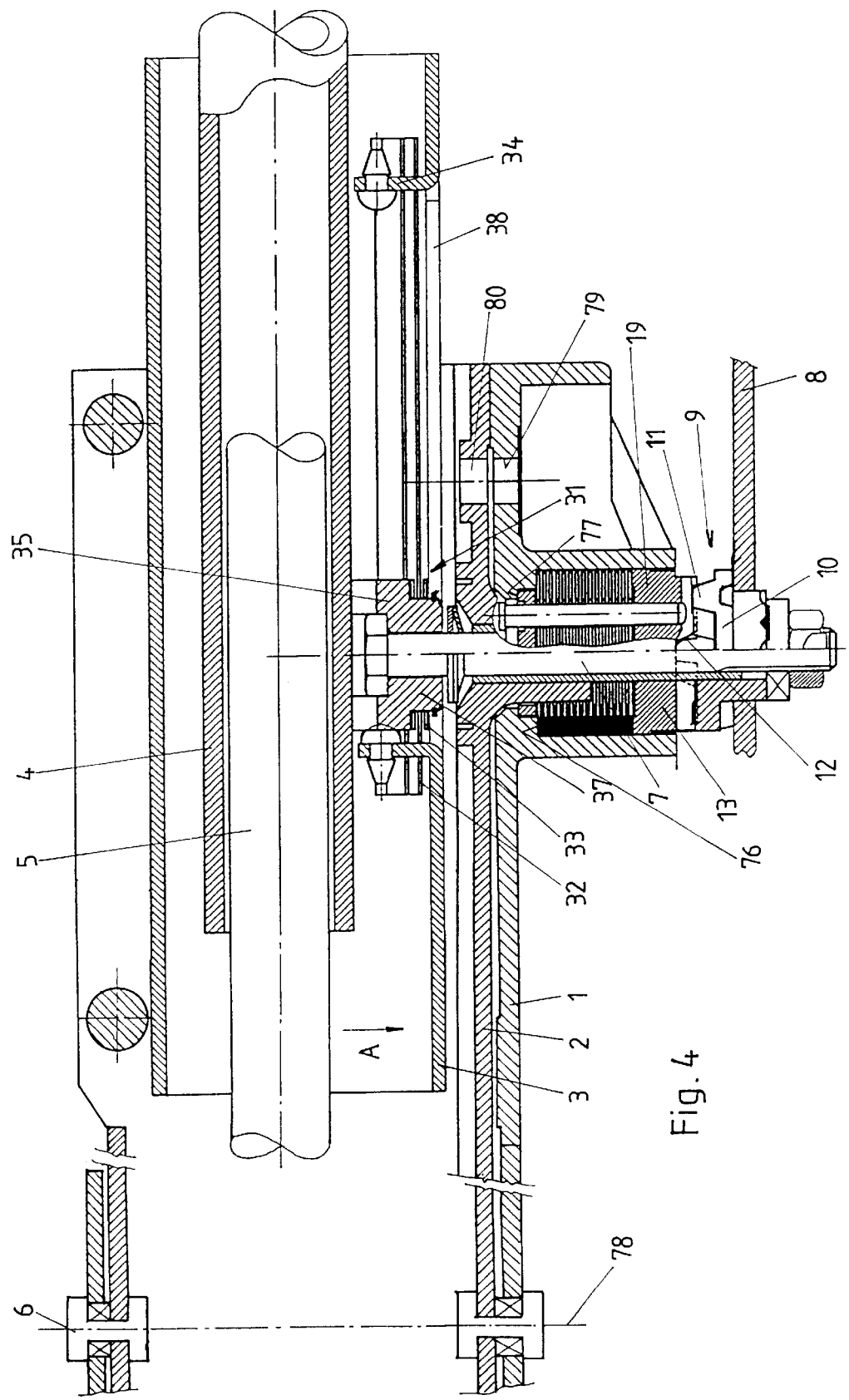
FIG. 4 a longitudinal cross-sectional view of a steering column according to the present invention.
Figure 6:
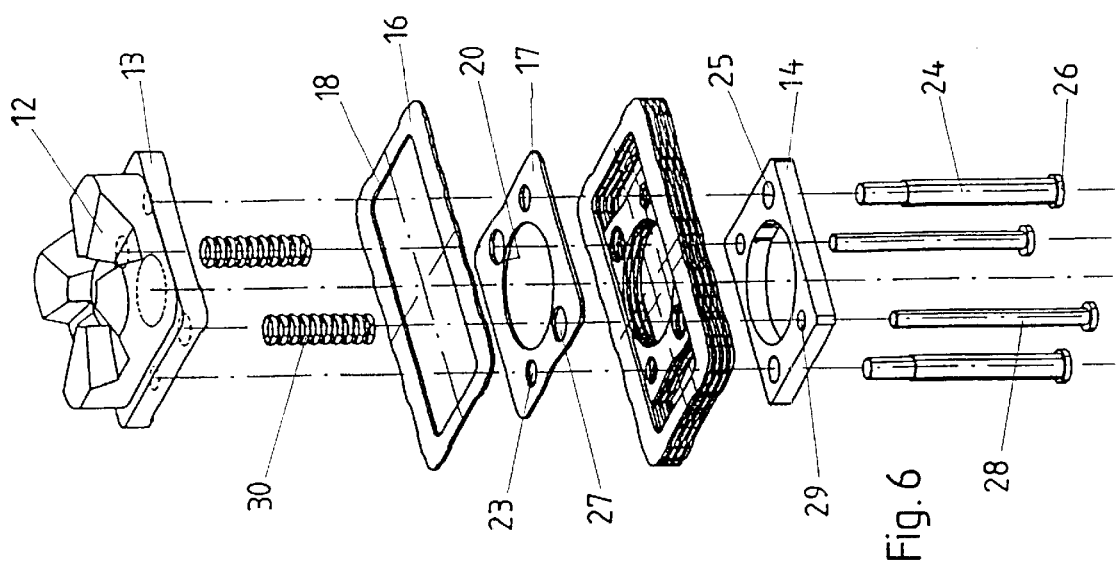
FIG. 6 an exploded view of a first adjusting device used with a steering column.
Figure 5:
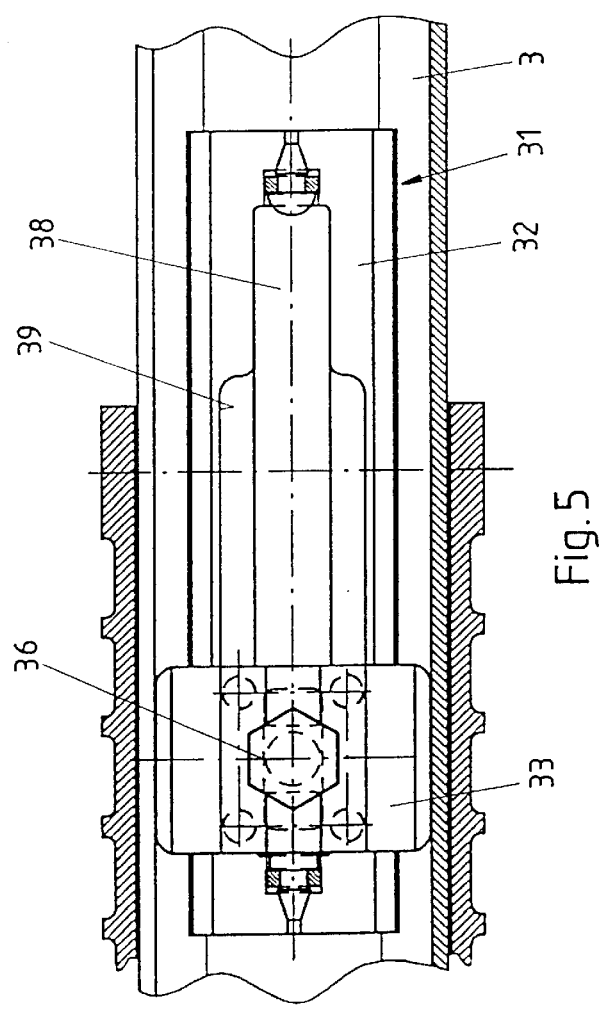
FIG. 5 a partially cross-sectional view of a steering volume tube of the steering column according to the present invention.

A first embodiment of a steering column according to the present invention is shown in FIGS. 1–6. The steering column includes a guide member 2 which is supported in a bracket 1, which is fixedly secured to a motor vehicle chassis, for a pivotal movement about an axis 78 extending transverse to a steering shaft 5. The guide member 2 is supported by bolts 6 which extend through the vertical cheeks of the bracket 1 and through the guide member 2, as shown in FIG. 4. A steering volume tube 3 is supported in the guide member 2 for displacement in a direction of an axial extent of the steering shaft 5. The steering volume tube 3 surrounds the steering shaft 5 which is rotatably supported in a jacket tube 4.

The height or inclination adjustment of the steering column is effected by pivoting the guide member 2 relatively to the fixed to the chassis, bracket 1. The guide member has a pivotal range of several degrees. A longitudinal adjustment of the steering column is effected by axially displacing the steering volume tube 3 relative to the guide member 2. To this end, the steering shaft 5 is provided with a universal joint (in the region of bolts 6) and a telescopic section. These elements of the steering column do not form part of the present invention and would not be described in detail.

First and second adjusting devices are arranged, respectively, between the bracket 1 and the guide member 2 and between the guide member 2 and the steering volume tube 3. Both adjusting devices are activated by the same locking device. The locking device includes a locking bolt 7 and locking member 9 which is actuated with a locking lever 8. The locking member 9 is formed as a cam member 10 having at least one cam 11 that cooperates with helically shaped or inclined surfaces 12 of outer surface means of a first clamping plate 13 of the first adjusting device (see FIG. 6). Upon a pivotal movement of the locking lever 8 by an angle, e.g., of 45°, an inwardly directed force is applied to the clamping plate 13 whereby a tensile or traction force acts on the locking bolt 7.

The first adjusting device includes a stack of lamellas 15 which is arranged between the first clamping plate 13 and a second clamping plate 76 which is formed by a portion of the bracket 1. The lamella stack 15 is formed of large lamellas 16 and small lamellas 17. The large lamellas 16 are floatly supported in a chamber 19 formed in the bracket 1. The inner profile of the chamber 19 corresponds, with some clearance, to the outer profile of the large lamellas 16. As a result, the large lamellas 16 do not substantially displace in the direction of the height adjustment of the steering column, while being displaceable in the axial direction of the locking bolt 7 by the clamping plate 13, with the spacing between lamellas being changed. The large lamellas 16 have each an inner recess 18 which provide, in the open position of the first adjusting device, for pivotal movement of the guide member 2 relative to the bracket 1, as it would be explained in more detail below. The locking bolt 7 extends through the recesses 18 and further through the opening 71 in the bracket 1.

The small lamellas 17 likewise have inner recesses 20 through which the locking bolt 7 also extends. A sleeve 21 is mounted on the locking bolt 7. The sleeve 21 extends, together with the bolt 7 through the recesses 20. A tubular projection 22 of the guide member 2 also extends through the recesses 20 of the small lamellas 17. The projection 22 supports the locking bolt 7 which, in the first embodiment, is located on only one side of the steering column and not completely extends therethrough.

The small lamellas 17 have bores 23, which are arranged diagonally opposite each other, for receiving guide bolts 24. The guide bolts 24 are secured in the first clamping plate 13 and extend, with a clearance, through guide bores 25 in a stop plate 14. The heads 26 of the guide bolts 24 engage the edges of respective guide bores 25 on the back side of the stop plate 14, forming a stop for the first adjusting device in the open position of the locking device. The guide bolts 24 carry the small lamellas 17 during the pivotal movement of the guide member 2 relative to the bracket 1, which takes place with the first adjusting device being in the open position. During the pivotal movement of the guide member 2, the first clamping plate 13 is displaced in a vertical direction relative to the bracket 1 in the chamber 19 of the bracket 1. The stop plate 14 is supported against a shoulder 77 of the bracket 1 in the region of the opening 71.

The small lamella further have each arranged diagonally opposite each other, bores 27 through which spring bolts 28 extend. They, as the guide bolts 24, are secured in the first clamping plate 13 and extend through the guide bores 29 in the stop plate 14. The bores 27 are made so large that the can receive respective compression springs 30 which are formed as helical springs and are supported on the spring bolts 28. The compression springs 30 are supported between the clamping plate 13 and the stop plate 14 and, in the open position of the locking device, bias the plate 13 and the plate 14 away from each other until the heads 26 of the guide bolts 24 and the spring bolt 28 abut the stop plate 14. During the height or vertical adjustment, the stop plate 14 slides over the shoulder 77. In the open position of the locking device, the compression springs 30 keep the stop plate 14 and, thereby, the second clamping plate 76 away from the first clamping plate 13.

FIGS. 2–4 show a closed position of the locking device. All cross-sections are taken above the longitudinal axis of the locking bolt 7.

A bolt (not shown for a sake of clarity) extends through a longitudinal bore 79 and bore 80 for guiding the guide member 2 in the bracket 1. The bracket 1 can be formed of two or more parts e.g., the second clamping clamping can be formed as a separate part located inside the chamber 19. Further, instead of being arranged in the chamber 19, the large lamellas 16 of the lamella stack 15 can be displaceably floatingly supported on, preferably, two guide journals arranged outside of the small lamellas 17. Still further, the large lamellas 16 can be supported on a single journal at one of their sides and be provided with a sidewise projection. They also can be displaceably supported on at least one guide journal extending through the guide openings formed therein. Such lamellas are called "flutter lamellas". The flutter lamellas will be described further below in more detail, when describing a further embodiment of a steering column in combination with a second adjusting device.

The second adjusting device, which is used for the longitudinal adjustment of the steering column, includes a lamella stack 31 with large and small lamellas 32, 33. The large lamellas 32 have openings with which they are supported on extending inward webs 34 of the steering volume tube 3 for displacement in the axial direction of the locking bolt 7. However, the large lamellas 32 are not displaceable in the longitudinal direction (in the direction of the steering shaft). The lamella stack 31 is located between first and second clamping plates 35 and 68. The first clamping plate 35 is supported on the locking bolt 7 the head 36 of which engages behind a shoulder of the clamping plate 35. The clamping plate 35 has two shaped projections 37 extending on opposite sides of the locking bolt 7 and projecting through recesses in the small lamellas 33. The second clamping plate 68 is formed by an inner surface of the steering volume tube 3 which surrounds a longitudinal bore 38 through which the locking bolt 7 projects into the steering volume tube 3 and into which the projections 37 of the first clamping plate 35 extend. The large lamellas 32 have each an inner recess 39. The recesses 39 provide for displacement of the steering volume tube 3 in the axial direction of the steering shaft 5. In the clamping plate 35, there are formed blind bores 40 for receiving therein compression springs 41. The blind bores 40 are formed in the corners of an imaginary rectangle. Sliding bolts 42 are pushed into the compression springs 41, which are formed as helical springs, at their ends opposite the ends received in the blind bores 40. The head of the slide bolt 42 engages the respective compression spring 41 and is slidably supported, with its end surface, against the inner surface of the steering volume tube 3. The compression springs 41 and the slide bolts 42 extend through inner recesses 39 of the large lamellas 32 and bores in the small lamellas 33. In the open position of the locking device, the compression springs 41 bias the first clamping plate 35 away from the second clamping plate 68 formed by the inner surface of the steering volume tube 3 until a slidable stop disc 43 abuts the outer surface of the steering volume tube 3. The slidable stop disc 43 is displaceably supported on the locking bolt 7. The stop disc 43 is connected, in the region of its circumference, with a spring ring 44 supported on the locking bolt 7 and welded thereto. The stop disc 43 is connected with the spring ring or washer 44 with a possibility of a limited axial displacement relative thereto.

Because the longitudinal adjustment requires a small adjustment force, the lamella stack 31 contains only two large lamellas 32 and two small lamellas 33. The use of this number of lamellas is made possible by providing, at the inner region of the lamellas 32, 33 upper and lower edge strips 45, 46 tangent-bent in a direction toward the steering shaft 5. The inner surface of the steering volume tube 3, which forms the second clamping plate 68, and the outer surface of the first clamping plate 35 are also tangent-bent in accordance with the shape of the lamellas 32, 33. In this way, upon the tensioning of the lamella stack, a wedge effect takes place which increases the holding force of this friction locking connection.

A first adjusting device for effecting the height adjustment which is associated with the second embodiment of a steering column has a somewhat different construction which is shown in FIGS. 7–13. In this embodiment, a projection 47 of the first clamping plate 13 extends through the recesses 20 of the small lamellas 17 which are displaceably supported on the projection 47. The projection 47 further extends through an opening 48 formed in the stop plate 14 which is displaceably supported thereon for displacement in the axial direction of the locking bolt 7. In the projection 47, in the corners of an imaginary rectangle, there are formed channel-like recesses 49 in which the compression springs 30 are arranged. The springs 30 are supported, at their opposite ends, against the first clamping plate 13 and the stop plate 14. The stop plate 14 is provided with corresponding ear-shaped projections 50 which extend into the channel-like recesses 49. For limiting the displacement of the stop plate 14 over the projection 47, in the open position of the locking device, a fixed stop ring 51 is provided on the projection 47. The projection 47 has a central stepped through-opening 72 through which the locking bolt 7, together with a sleeve 21 supported thereon, extend, projecting into the tubular extension 22 of the guide member 2.

Figure 13:
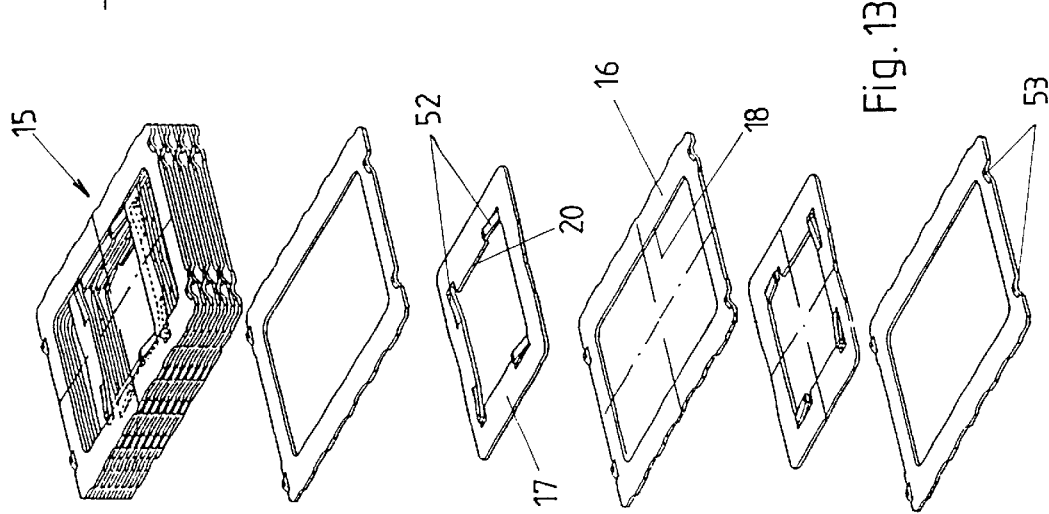
FIG. 13 a partially exploded view of a stack of lamellas used in a second embodiment of a steering column according to the present invention.
Figure 14:
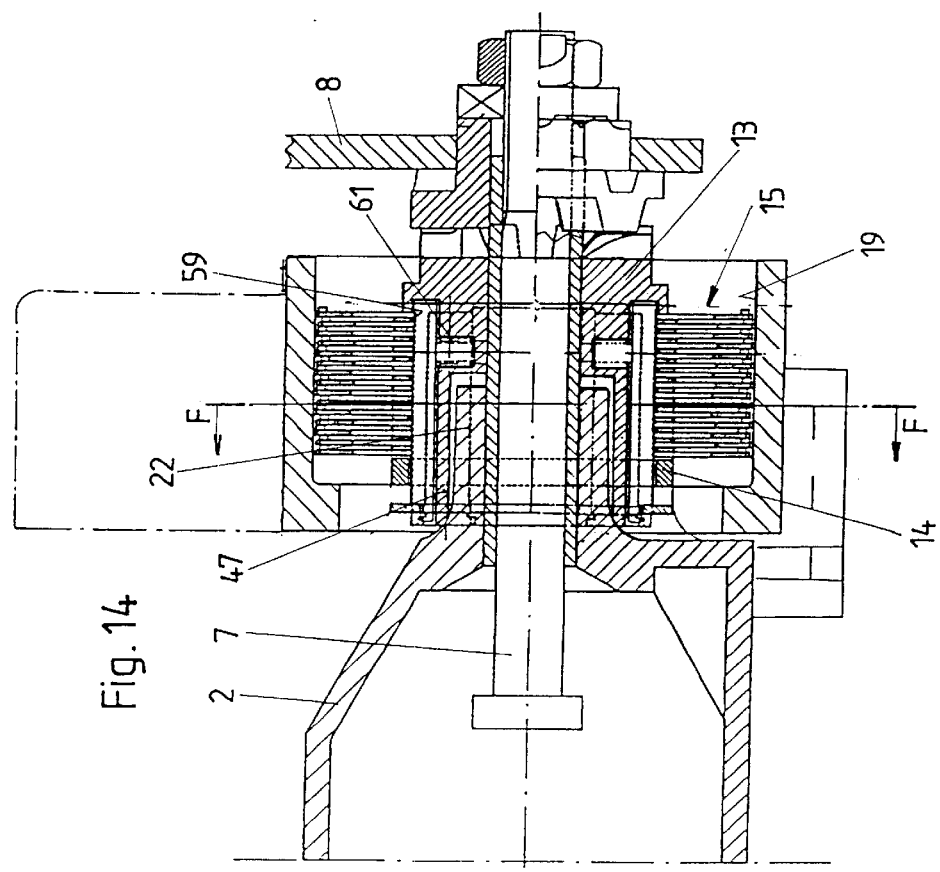
FIG. 14 a cross-sectional view of a third embodiment of a steering column according to the present invention.

As shown in FIG. 13, the small lamellas 17 have spring arms 52 adjoining the recess 20. The spring arms 52 extend through inner recesses 18 of the large lamellas 16 and are supported against side walls of a next small lamellas 17. To this end, the following each other small lamellas 17 are pivoted relative to each other by an angle of 180°. These spring arms, which have a small biasing force, contributes to the separation of the lamella stack 15 in the open position of the locking device, which is provided by the compression springs 30. If the spring arms 52 are formed with a greater biasing force, the compression springs 30 can be eliminated. On the other hand, with an adjusting device according to FIGS. 7–12, the small lamellas 17 can be formed without the spring arms 52.

Spring arms for spacing the lamellas 16 and 17 in the open position of the adjusting device, in addition to being provided on the small lamellas 17, can be also provided on the large lamellas 16. The spring arms on the large lamellas 16 should be located outside of the circumferential profile of the small lamellas 17 and should have only a small displacement range.

In the embodiment of the lamella stack shown in FIG. 13, the large lamellas 16 have, on one of their sides, projecting side elevations 53 the height of which corresponds substantially to the thickness of small lamellas. These elevations 53 prevent a two big tilting of the floating lamellas stack in the open position of the locking device. Also, the elevations with half of the height of the elevations 53 can be provided on both opposite sides of the large lamellas 16.

In the embodiments shown in the drawing, the first clamping plate 13 is displaced in the chamber 19 with a small clearance between the clamping plate 13 and the wall of the chamber 19. By selecting an appropriate thickness of the clamping plate 13, its tilting during closing of the locking device is prevented. Basically, it is also possible to guide of the first clamping plate 13 by having its extension 47 guided in the respective recess of the stop plate 14.

Figure 15:
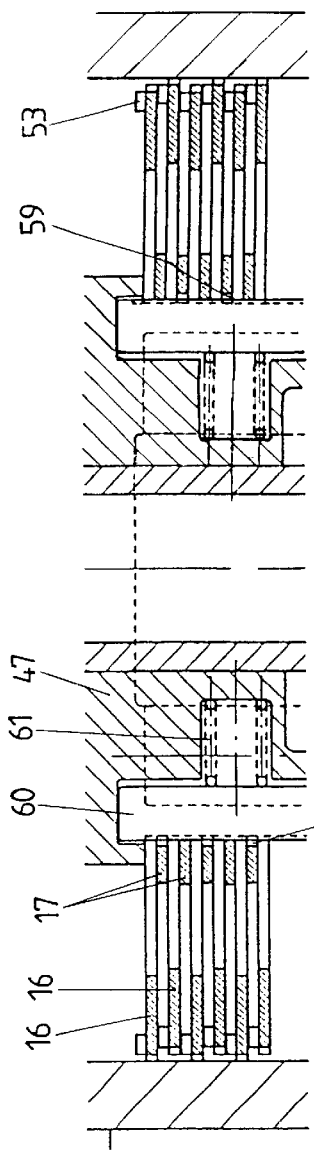
FIG. 15 a cross-sectional view, at an increased scale, of a section of the steering column shown in FIG. 14.
Figure 17:
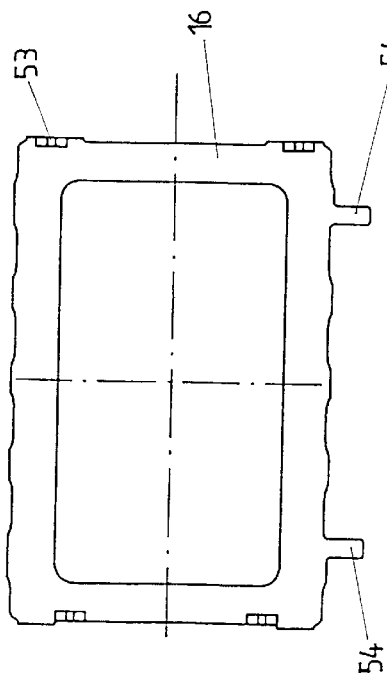
FIG. 17 a plan view of a large lamella according to a third embodiment of a steering column according to the present invention.
Figure 16:
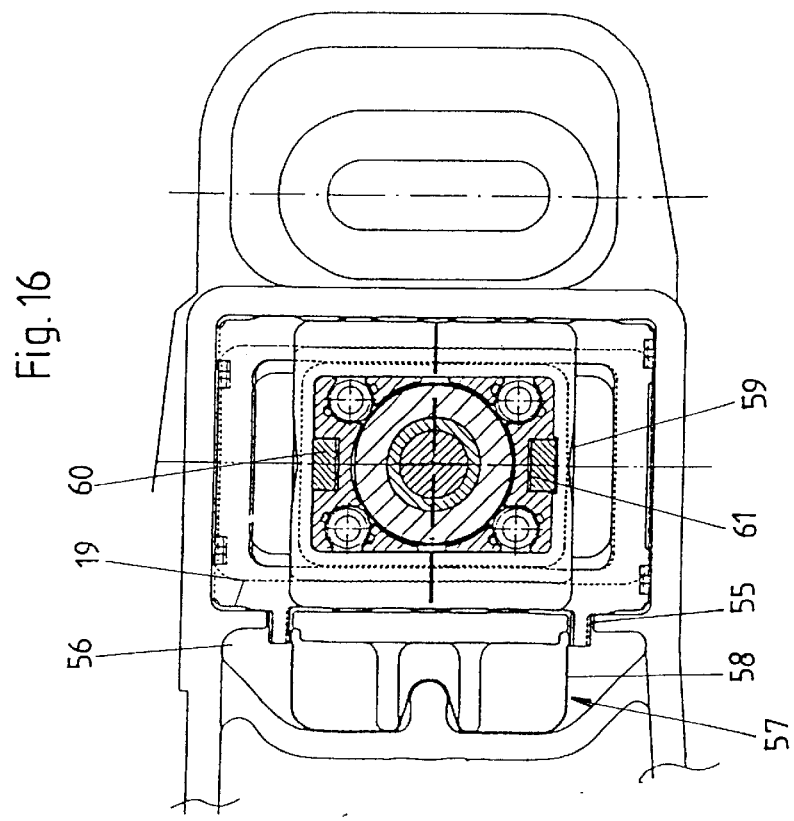
FIG. 16 a cross-sectional view along line F—F in FIG. 14.

The embodiment of a steering column according to the present invention, which is shown in FIGS. 14–17 corresponds substantially to the above-described second embodiment and differs therefrom in that it includes additional means for preventing or for substantially reducing the backlash of the first adjusting device in the closed position of the locking device (when a larger force acts in the direction of the height adjustment). To insure this, more of the lamellas must be supported by a stop. The reduction of the backlash is based on an alternating preloading of both the large and small lamellas upwards and downwards. This preloading insures that in the open position of the locking device, they are biased against respective walls with a smaller spring force and, in the closed position of the locking device, the backlash, which is caused by slackness of the lamellas in the chamber 19 and of the projection 47, is avoided. At that, more of the lamellas (about 15%) should abut a stop. To this end, the large lamellas 16 are provided, e.g., on their respective circumferential profiles, with projecting noses 54 which extend through a slot 55 formed in the wall of the chamber 19 and into a rib-shaped space 56. A leaf spring 57 is located in the space 56, with the leaf spring arms 58 biasing the noses 54 upwards or downwards. As can be seen in FIG. 16, the noses 54 of the first lamellas (with add numbers 1, 3, 5 . . . ) lie further below than the noses 54 of the second lamellas (with even numbers 2, 4, 6 . . . ). Both types of large lamellas, first and second, alternatively follow one another, so that the large lamellas 16 are biased, alternatively, by the spring arms 58 of the leaf spring 57 upwardly and downwardly, with the displacement of the small lamellas 17 still being possible despite of that. It is also possible to use only one type of large lamellas 16, with different heights of the noses 54 being achieved by pivoting adjacent lamellas about a vertical axis, which can be seen in FIG. 17, by 180°. The spring arms 58 also provide for adaptation of the conicity of the mold to the wall of the chamber 19.

Preloading of (large and/or small) lamellas in a diagonal direction is also possible.

The small lamellas 17 have, in the edge of their central recess 20, an indentation 59 which is provided in the region of their upper or lower legs. the small lamellas 17 are alternatively pivoted by 180° about a horizontal axis so that the recesses or indentations 59 are located alternatively on the upper or inner side. In the projection 47 of the first clamping plate 13, in the region of the indentation 59, there are provided compression beams 60 which are biased by compression springs 61. The compression beams 60 alternatively bias the small lamellas 17 upwardly (even numbers 2, 4, 6 . . . ) and downwardly (odd numbers 1, 3, 5 . . . ), dependent on which side the indentation 59 is located. The region of a small lamella, which is located sidwise of the indentation 59, firmly abuts the projection 47 at a side opposite that subjected to action of the compression beam 60. This insures slackness of the small lamellas 17 (even with application of a high displacement force, with respect to the projection 47). The positions and the stop positions of the large and small lamellas 16 and 17, which are subjected, respectively, to biasing forces of the leaf springs 57 and the compression beams 60 and compression springs 61, are shown in FIG. 15.

Figure 18:
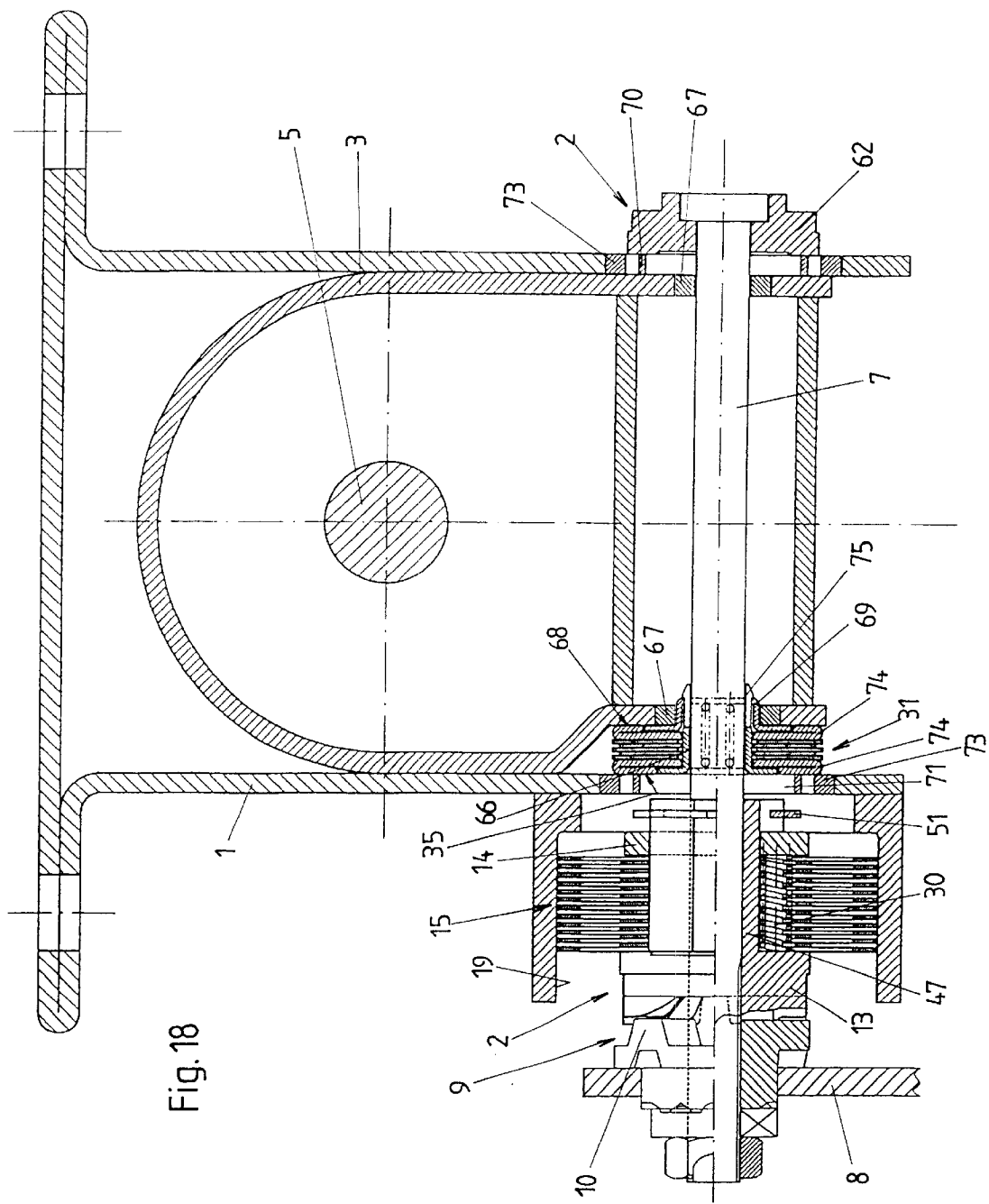
FIG. 18 a cross-sectional view of a fourth embodiment of a steering column according to the present invention.

In the embodiment of a steering column according to the present invention shown in FIGS. 18–20, the locking bolt 7 extend through the entire column. The bracket 1 in this embodiment has a U-shape with two cheeks and surrounds the steering volume tube 3 which, in turn, surrounds the steering shaft 5. In this embodiment, the guide member 2 is located on an outer side of the bracket 1 and is formed by a clamping plate 13 and a head clamping plate 62 which abuts an outer surface of the bracket leg located opposite the clamping plate 13. The head of the bolt 7 is located in a recess formed in the clamping plate 62. The pivot axis, which is defined by the connection bolts 6, in this embodiment coincides with the axis of the locking bolt 7.

The first adjusting device for height-adjustment of the steering column is similar to that described with reference to FIGS. 9–13 for the second embodiment of the inventive steering specimen. The clamping plate 13 has a projection 47, which extends through the large and small lamellas 16 and 17 and which supports the stop plate 14 displaceable therealong. To limit the displacement of the lamellas in the open position of the locking device, there is provided a stop ring or clip 51. In the projection 47 of the clamping plate 13, there are provided channel-shaped recesses in which compression springs 30, which are formed as helical springs, are received. The compression springs 30 are supported at their opposite ends by the clamping plate 13 and the stop plate 14, whereby the lamellas are kept spaced in the open position of the locking device. In order to obtain smaller dimensions of the entire device, only two channel-shaped recesses with compression springs are provided above and below the locking bolt 7. The lamella stack 15 can be divided in two halves, with the second half of the lamellas, which are located in the chamber 19, being provided at a right side, beneath the head clamping plate 62.

The second adjusting device, in this embodiment, is arranged between the bracket 1 and the steering volume tube 3. In this case, a certain portion of the circumference of the bracket 1 is formed resilient. The large lamellas 32 of the adjusting device are secured, at one of their sides, on a journal 63 of the steering volume tube 3. At their opposite sides, the lamellas 32 are provided with guide openings 64 through which a journal 65 of the steering volume tube 3 extends with a clearance. The large lamellas 32 are formed as so-called "flutter lamellas" and are changeable, at least in the region of their inner recesses 18. In the axial direction of the steering shaft 5, the large lamellas 32 do not displace. A lamella group, which is formed of the large and small lamellas 32, 33, is located between first and second guide lamellas 74 and forms therewith a lamella stack 31 which has a central opening through which a locking bolt 7 extends. A spring cup 66 has a detent nose 75 on which the small lamellas 33 and 74 are supported and which extends through a longitudinal bore 38 in the steering volume tube 3. Blind bores 40, in which compression springs 41 are received, are formed in the spring cup 66 on the left and right sides of the locking bolt 7, as seen in FIG. 20. The compression springs 41 are supported, at their opposite ends, against the spring cup 66, on one hand, and against a spring sump 69, on the other hand, which has, in the region of the longitudinal bore 38, a pot-shaped element extending into the longitudinal bore 38, and which is supported on the neck of the detent nose 75 of the spring cup 66 for displacement in the axial direction of the locking bolt 7. Projections, which are provided at the free end of the detent nose 75 limit the displacement of the small lamellas 33 and 74 in the open position of the locking device. The surface of the spring sump 69, which abuts the outer tide of the steering volume tube, is formed as a sliding surface.

The first clamping plate 35 is formed by an inner surface of the bracket, which is adjacent to the lamellas stack 31, and the second clamping plate 68 is formed by an outer surface of the steering volume tube 3 adjacent to the lamella stack 31. In the open position of the locking device, the lamella stack 31 is kept in its release position as a result of the clamping plates 35 and 38 being spaced by a distance group 37, 69, 66 cooperating with the compression springs 41.

The longitudinal bore 38 is limited by an elongate sliding member 67 provided with a stop stirrup 70 for the spring sump 69 and which limits the axial displacement of the steering volume tube 3.

Instead of a floating arrangement, the large lamellas 16 of the first adjusting device for height adjustment can be formed, similar to the large lamellas 16 of the second adjusting device for longitudinal adjustment, as flutter lamellas.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A device for effecting height and longitudinal adjustment of a steering column of a motor vehicle, comprising a first adjusting device for height adjusting the steering column; a second adjusting device for longitudinally adjusting the steering column; a locking device having open and closed positions for simultaneously opening and closing the first and second adjusting devices and including a locking bolt; a bracket fixedly securable to a motor vehicle chassis; a guide member pivotally supported on the bracket, the locking bolt being supported in the guide member and extending through an opening formed in the bracket, the locking bolt being displaceable in the guide member in a direction of a locking bolt axis and being displaceable, for the height adjustment of the steering column, together with the guide member, transverse to an axial extent thereof and substantially transverse to an axial extent of a steering shaft of the steering column; and a steering volume tube having a longitudinal bore extending in an axial direction of the steering shaft and through which the locking bolt extends, the steering volume tube being displaceable in the axial direction of the steering shaft to provide for longitudinal adjustment of the steering column, wherein the first adjusting device comprises a lamella stack formed of alternating large and small lamellas through which the locking bolt extends, first and second clamping plates arranged on opposite sides of the lamella stack for clamping same in a closed position of the first adjusting device, and spring means for distancing the first and second clamping plates further away from each other in an open position of the first adjusting device, wherein the large lamellas are arranged one of in the bracket and on the bracket with a possibility of changing of spacing therebetween but without a possibility of displacement in a direction of the height adjustment of the steering column, the large lamellas each having an inner recess for enabling displacement of the locking bolt relative to the bracket in the open position of the first adjusting device to enable the height adjustment of the steering column, and wherein the small lamellas are arranged for displacement in an axial direction of the locking bolt but without a possibility of displacement relative to the locking bolt in the direction of the height adjustment of the steering column, the small lamellas being displaceable with respect to the large lamellas in the open position of the first adjusting device upon the displacement of the locking bolt relative to the bracket.

2. A device as set forth in claim 1, wherein the bracket has a chamber, and the lamella stack is arranged in the bracket chamber with a clearance between a chamber wall and an outer profile of the large lamellas, whereby the large lamellas are floatingly displaceable in the axial direction of the locking bolt but are supported against a possibility of displacement in the direction of the height adjustment except of a distance corresponding to a clearance width.

3. A device as set forth in claim 2, wherein the first clamping plate is supported on the locking bolt for displacement in the axial direction of the locking bolt, and wherein the second clamping plate is formed by a region of the bracket located inside the bracket chamber.

4. A device as set forth in claim 1, wherein the spring means comprises compression springs arranged between the first clamping plate and stop plate supported against a shoulder of the bracket and displaceable relative to the bracket in the direction of height adjustments of the steering column.

5. A device as set forth in claim 4, wherein the shoulder is provided in the bracket chamber.

6. A device as set forth in claim 4, wherein the first adjusting device further comprises at least one guide bolt extending parallel to the locking bolt, secured in the first clamping plate, extending through respective openings in the small lamellas and the stop plate, and having an outer diameter only slightly smaller than diameters of the respective openings formed in the small lamellas and the stop plate.

7. A device as set forth in claim 6, wherein the first adjusting device further comprises another guide bolt secured in the first clamping plate and extending parallel to the locking bolt and through further respective openings in the small lamellas and the stop plate, the at least one and another guide bolts being arranged on opposite sides of the locking bolt.

8. A device as set forth in claim 1, wherein the locking device further comprises a locking member having at least one cam that cooperates with one of a helical surface and an inclined surface of the first clamping plate adjacent thereto, and a locking lever for pivoting the locking member between the open and closed position of the locking device.

9. A device as set forth in claim 1, wherein the spring means comprises at least one compression spring, and the first adjusting device further comprises a stop plate and at least one spring bolt extending parallel to the locking bolt, secured on the first clamping plate, and having a free end thereof extending with a clearance through a guide bore formed in the stop plate, and wherein the at least one compression spring is supported on the at least one spring bolt between the first clamping plate and the stop plate, and the at least one spring bolt, together with the at least one compression spring, extends through spring bores formed in the small lamellas.

10. A device as set forth in claim 9, wherein the first adjusting device comprises a further spring bolt extending a parallel to the locking bolt, secured on the first clamping plate, and arranged on a side of the locking bolt opposite a side the at least one spring bolt is arranged.

11. A device as set forth in claim 1, wherein the first clamping plate has a projection with a central opening through which the locking bolt extends, the locking bolt further extending through central openings in the small lamellas and through a central opening in the stop plate which is supported for displacement relative to the bracket, together with the first clamping plate in a direction of the height-adjustment of the steering column.

12. A device as set forth in claim 11, wherein the projection has at least one channel-shaped recess extending in an axial direction of the locking bolt on an opposite side of the locking bolt, and wherein the spring means comprises a compression spring located in the channel-shaped recess and supported against the first clamping plate and the stop plate.

13. A device as set forth in claim 1, wherein the small lamellas each have a sidewise projecting spring arm supported against a side wall of an adjacent small lamella.

14. A device as set forth in claim 13, wherein the spring arm is received in an inner recess of a respective large lamella.

15. A device as set forth in claim 13, further comprising means for biasing the small lamellas in a direction of the height adjustment of the steering column and which permits to reduce backlash when a large adjustment force is applied to the steering column in the direction of the height adjustment in the closed condition of the first adjusting device, wherein following one another small lamellas are alternatively biased in downward and upward directions or in alternating diagonal upward and downward directions.

16. A device as set forth in claim 15, wherein the small lamella biasing means comprises one of upper and lower legs of respective small lamellas which limit indentations provided on inner sides of central openings of the small lamellas, compression beams supported in the projection of the first clamping plate in a region of the indentations, and compression springs for biasing the compression beams, and wherein an upper compression beam lies on each second of the upper legs of the small lamellas and is spaced from the upper legs of respective intermediate small lamellas by respective indentations of the respective upper legs, and a lower compression beam lies on each second of the lower legs of the intermediate small lamellas and is spaced from the lower legs of the small lamellas which it does not engage by indentations of the non-engagable lower legs.

17. A device as set forth in claim 16, wherein the guide member pivots relatively the bracket about a horizontal axis extending transverse to the steering shaft for effecting the height adjustment of the steering column.

18. A device as set forth in claim 1, wherein the large lamellas each have sidewise projecting spring arms located outside of a circumferential profile of respective small lamellas and supported against a side wall of respective adjacent large lamellas.

19. A device as set forth in claim 1, wherein in order to prevent an excessive tilting of the lamella stack in the open position of the locking device, the large lamellas are provided with side elevations extending above one of their respective side surfaces, each side elevation extending above a respective side surface of a respective large lamella by a distance corresponding to a thickness of a small lamella.

20. A device as set forth in claim 1, further comprising means for biasing the large lamellas in a direction of the height adjustment of the steering column and which permits to reduce backlash when a large adjustment force is applied to the steering column in the direction of the height adjustment in the closed condition of the first adjusting device, wherein following one another large lamellas are alternatively biased in downward and upward direction or in alternating diagonal upward and downward directions.

21. A device as set forth in claim 20, wherein the large lamella biasing means comprises located in a plane of the large lamellas, projecting noses which extend beyond a circumferential profile of the large lamellas, and a spring arm extending in the axial direction of the locking bolt over a length of the lamella stack and lying on the noses for biasing the large lamellas in respective directions by deflecting the noses alternatively in the downward and upward directions or in the alternating diagonal upward and downward directions.

22. A device as set forth in claim 1, wherein the first adjusting device is arranged between the bracket and the guide member, and the second adjusting device is arranged between the guide member and the steering volume tube.

23. A device as set forth in claim 1, further comprising a tubular projection fixedly connected with the guide member for supporting the locking bolt, the tubular projection extending through at least one of central openings of the small lamellas and a central opening formed in a projection of the first clamping plate.

24. A device as set forth in claim 1, wherein the locking bolt extends through the steering column, and wherein the first adjusting device is arranged between the bracket and a portion of the guide member formed by at least one of the first clamping plate and the clamping plate head, and the second adjusting device is arranged between the bracket and the steering volume tube.

25. A device as set forth in claim 1, wherein the second adjusting device is also based on a frictional connection.

26. A device as set forth in claim 25, wherein the second adjusting device comprises a lamella stack formed of alternating large and small lamellas through which the locking bolt extends, first and second clamping plates arranged on opposite sides of the lamella stack for clamping same in a closed position of the second adjusting device, and spring means for distancing the first and second clamping plates further away from each other in an open position of the second adjusting device, wherein the large lamellas are arranged one of in the steering tube and on the steering volume tube with a possibility of changing spacing therebetween but without of a possibility of displacement in an axial direction, the large lamellas having each an inner recess for enabling displacement of the steering volume tube in the axial direction of the steering shaft in the open position of the second adjusting device, and wherein the small lamellas are supported for displacement in the axial direction of the locking bolt but without a possibility of displacement relative to the locking bolt in the axial direction of the steering spindle, the small lamella being displaceable relative to the large lamellas during an axial displacement of the steering volume tube.

27. A device as set forth in claim 26, wherein the spring means of the second adjusting device comprises a plurality of compression springs.

28. A device as set forth in claim 27, wherein the compression springs are arranged in respective recesses formed in respective guide lamellas between a spring cup and a spring sump which has, in a region of a longitudinal bore of the steering volume tube, a pot-shaped formation extending through the longitudinal bore.

29. A device as set forth in claim 28, wherein the spring cup and sump are located in respective recesses formed in the guide lamellas and are displaced together with the guide lamellas upon displacement of the steering volume tube relative to the bracket.

30. A device as set forth in claim 27, wherein the second clamping plate of the second adjusting device has a shaped projection on which the small lamellas of the second clamping plate are supported for displacement in the axial direction of the locking bolt.

31. A device as set forth in claim 30, wherein the compression springs are located in blind bores formed in the shaped projection.

32. A device as set forth in claim 26, wherein the large and small lamellas of the second adjusting device have upper and lower edge strips tangent-bent in a direction toward the steering shaft, and wherein surfaces of the first and second clamping plates of the second adjusting device adjacent to respective lamellas have tangent-bent sections having a shape corresponding to that of the clamping plate.

33. A device as set forth in claim 26, wherein the second clamping plate of the second adjusting device is formed by a section of an inner wall of the steering volume tube which surround a longitudinal bore through which the locking bolt extends.

34. A device as set forth in claim 26, wherein the second clamping plate of the second adjusting means is supported on a free end of the locking bolt with a head of the locking bolt engaging an end surface of the second clamping plate in a region of an opening through which the locking bolt extends, and wherein the steering volume tube is displaced by the second clamping plate of the second adjusting means.

35. A device as set forth in claim 1, wherein the second adjusting device is formed by two compression plates preloaded by the locking bolt.

36. A device as set forth in claim 35, wherein the compression plates are formed by inner walls of the steering volume tube in a region of a longitudinal bore of the steering volume tube.

* * * * *